Patented Jan. 30, 1934

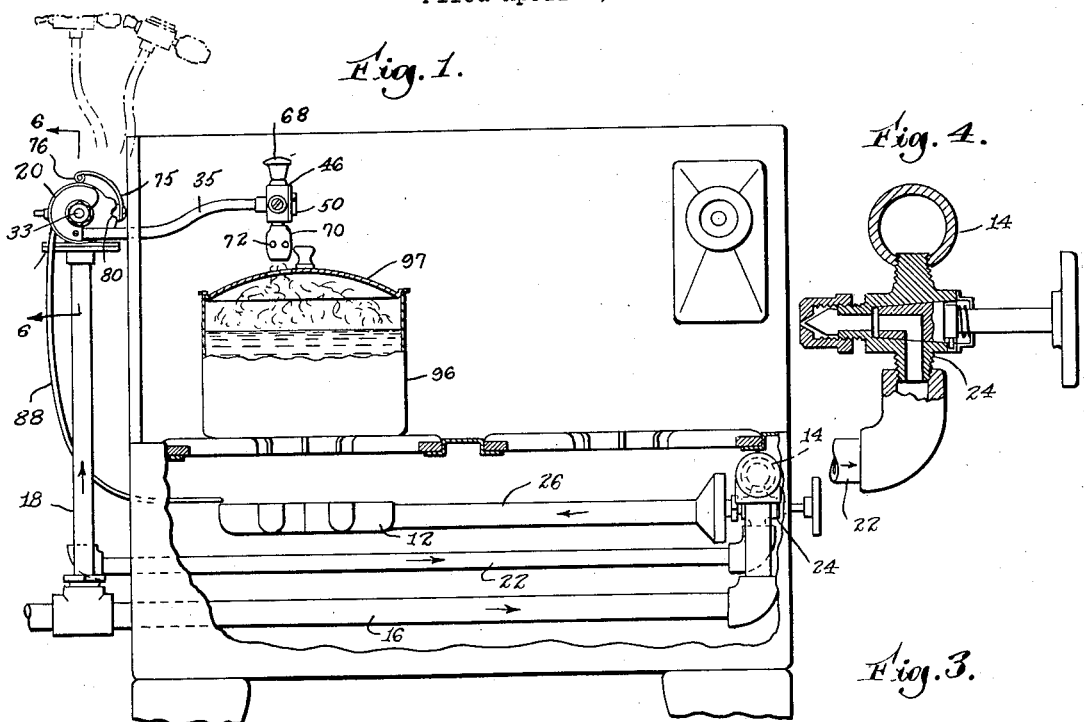
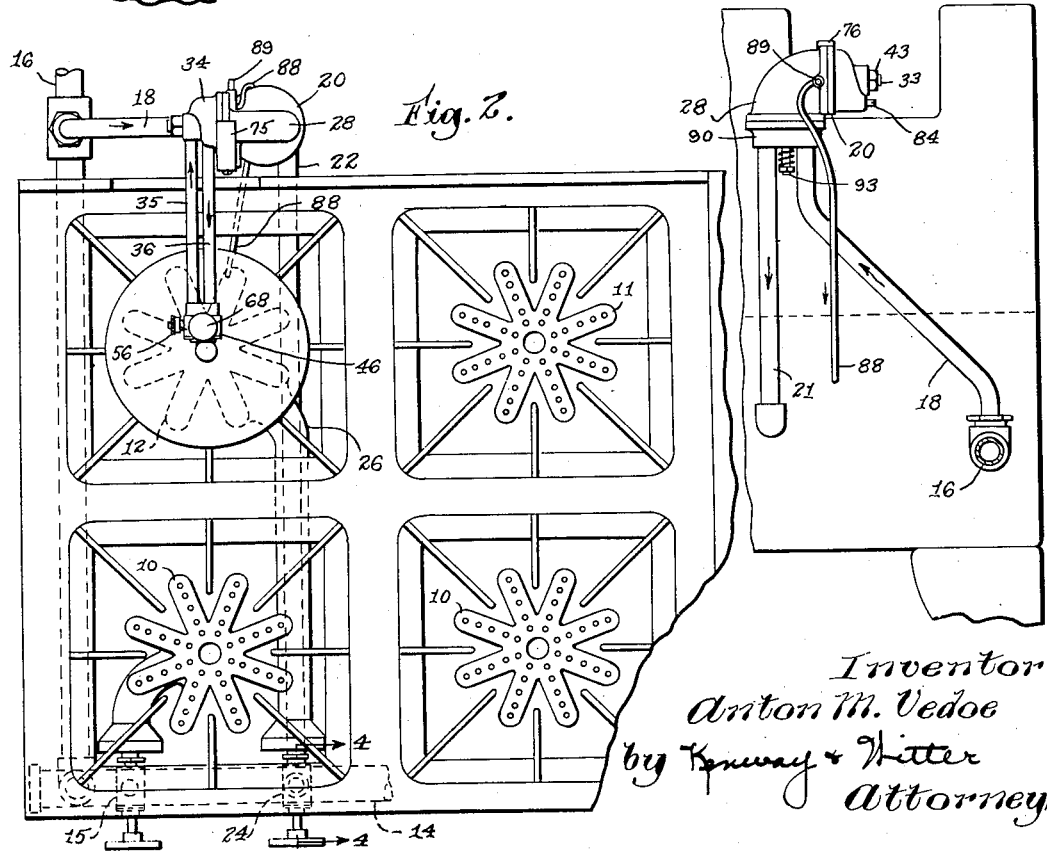

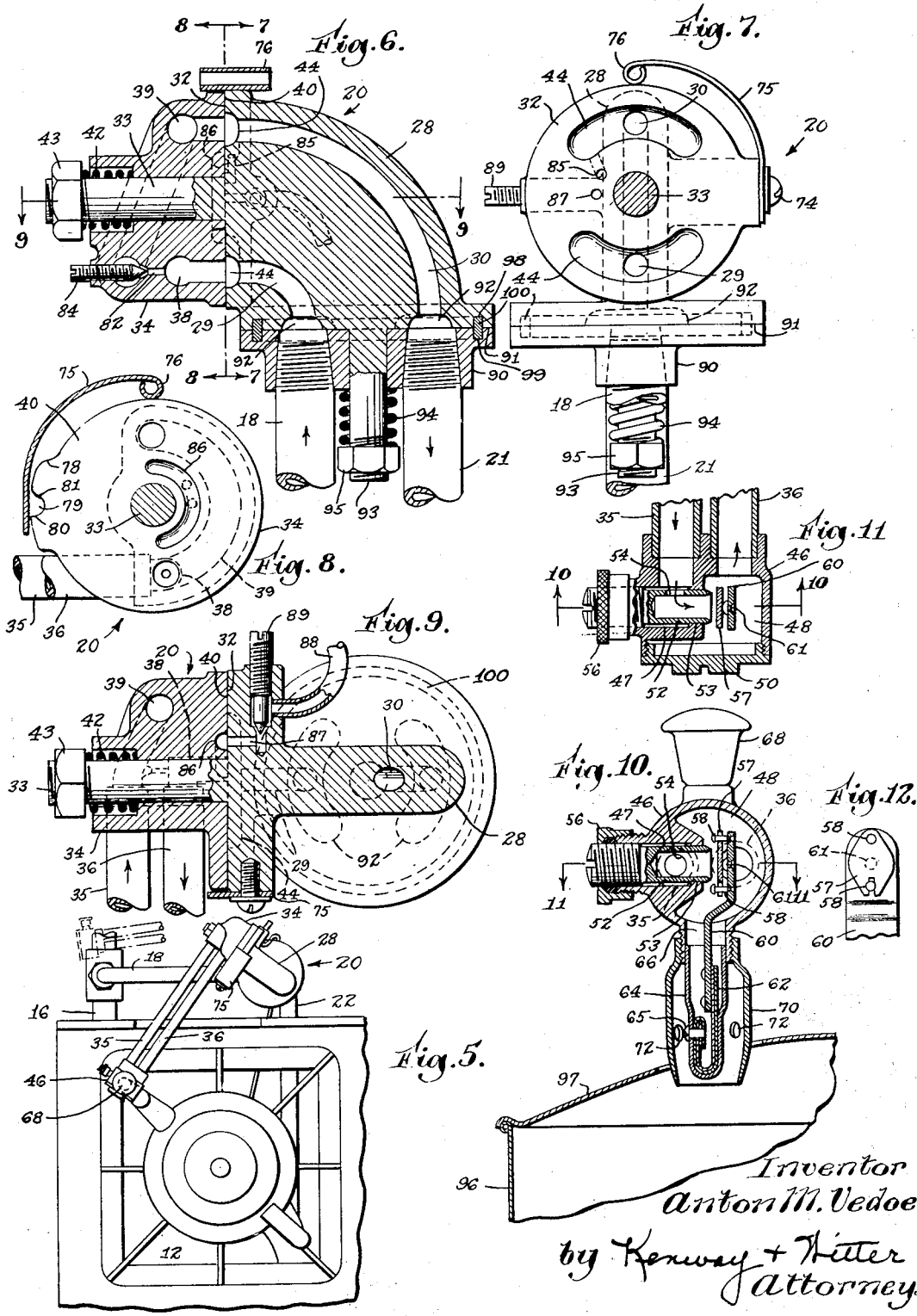

1,945,387

UNITED STATES PATENT OFFICE 1,945,387

FUEL REGULATOR

Anton M. Vedoe, Wollaston, Mass.

Application April 6, 1933. Serial No. 664,699

12 Claims. (Cl. 236—20)

This invention relates to fuel regulators, and more particularly to the art of automatic control of a gas burner in accordance with the vapor heat generated within a vessel being heated by the burner. I am aware that devices have been heretofore proposed which automatically regulate the flow of gas of a burner in accordance with the heat of vapor given off from a vessel being heated by the burner and in accordance with the temperature of the exterior surface of the vessel and, while these devices do perform such regulating functions, their action is inclined to be sluggish and erratic and they are not sufficiently sensitive to serve this purpose with the accuracy and speed necessary to a uniform and smooth heat control. One of the objects of my invention is to provide an improved regulator of the nature and for the purpose stated which will be sufficiently sensitive to give this desired automatic control.

In a copending application of E. L. Baker, Serial No. 612,755, filed May 21, 1932, is disclosed a gas controlling device embodying an arm mounted for vertical pivotal movement on conical bearing faces and carrying a thermostatic element for contacting with the exterior surface of a vessel over the burner to be controlled. My invention herein is of a similar nature and embodies various improvements thereover. One improved feature consists of a new combination embodying flat bearing faces in lieu of said conical faces, such flat faces being more economical to manufacture and it being possible to secure a more accurate contact between such faces, thereby providing a tighter gas joint. Another novel and valuable feature resides in the mounting of the arm for movement in a horizontal plane in addition to its said vertical movement, a second and like flat faced joint preferably being utilized for this purpose. The function served by this latter movement is to facilitate the cooperation of the thermostatic member with the vessel, as is hereinafter more specifically described.

Another novel and important feature of the invention resides in the provision of a housing for the thermostatic member whereby to protect such member from injury by accidental external contact and to provide a confined channel for conducting a flow of vapor past and into such close relation to the thermostatic member as to effect a more responsive movement thereof in accordance with the heat of the vapor. This housing is carried by the arm in position to accomplish these objects, all as hereinafter more specifically described.

These and other features of the invention will be best understood and appreciated from the following description of a preferred embodiment thereof, selected for purposes of illustration and shown in the accompanying drawings, in which Fig. 1 is a side elevation of a gas range equipped with my invention, certain portions being broken away;

Fig. 2 is a plan view thereof;

Fige. 3 is a fragmentary rear elevation;

Fig. 4 is an enlarged fragmentary view of a valve, partly in section, on line 4—4 of Fig. 2;

Fig. 5 is a fragmentary plan view showing the device in another position from that shown in Fig. 2;

Fig. 6 is an enlarged sectional view of the arm mounting taken on line 6—6 of Fig. 1;

Fig. 7 is an elevation taken on line 7—7 of Fig. 6;

Fig. 8 is an elevation taken on line 8—8 of Fig. 6;

Fig. 9 is a plan section taken on line 9—9 of Fig. 6;

Fig. 10 is a fragmentary sectional view through the thermostatic portion of the device on line 10—10 of Fig. 11 and a vessel associated therewith;

Fig. 11 is a fragmentary sectional view taken on line 11—11 of Fig. 10; and

Fig. 12 is a fragmentary elevation of the valve member shown in Figs. 10 and 11.

The gas range illustrated in the drawings comprises the usual front burners 10 and rear burners 11 and 12, and gas is supplied to the burners 10 and 11 from the manifold 14 connected to the supply pipe 16, valves 15 serving to control the flow of gas to these burners. The gas supplied to the rear burner 12 is under the control of my improved regulator and this mechanism will now be described.

Gas is supplied to the burner 12 from a branch pipe 18, the gas passing from this pipe through the controlling device 20 and from thence downwardly and forwardly through pipes 21 and 22, to and through a valve 24 hung from the manifold, as shown in Fig. 4, and then through the pipe 26 to the burner.

The controlling device 20 (Figs. 6-9) comprises a supporting member 28 having two ports 29 and 30 therethrough in communication with the pipes 18 and 21, these ports extending outwardly to a flat bearing face 32 on the member. A stud 33, carried by the member and extending outwardly from the flat face thereof, is adapted to carry the hub portion 34 of an arm 35—36. The arm comprises a pair of pipes 35 and 36 in communication with the ports 38 and 39 extending through the hub and into communication with a flat face 40 thereon. When the hub is fully mounted on the stud, the flat faces 32 and 40 are in contact and a spring 42 and nut 43 serve to hold these parts in this relation, whereby no gas can escape therefrom. Chambers or grooves 44 are provided within the face 32 whereby the ports 29 and 30 are respectively in communication with the ports 38 and 39 during a limited rotation of the hub on the member 28, as hereinafter described.

Mounted on the free ends of the pipes 35—36 is a member 46 having chambers 47 and 48 therein and with which the pipes 35 and 36 respectively communicate, the chamber 48 being closed by a threaded plug 50. Threaded into a laterally projecting portion of the member 46 and extending into the chamber 47 is a sleeve having a plane reduced inner portion 52 tightly fitting within a bore 53 between the two chambers. The port of the pipe 35 opens into the sleeve through an opening 54, thus providing gas communication into the chamber 48. The sleeve may be adjusted longitudinally by rotating the same and is made gas tight by means of a packing and a threaded bushing 56.

The inner end of the sleeve 52 provides an annular valve seat with which cooperates a plate valve 57 loosely mounted on pins 58 in the upper end of an arm 60, a pressure exerting abutment 61 for the valve being provided on the arm rearwardly of the valve and within the peripheral outline of the seat.

The arm is mounted on one end of a U-shaped bi-metallic plate 62 closely seated within the closed and restricted end of a relatively thin sheet metal cupped member 64. The other end of the plate 62 is secured to the member 64 by a screw 65 and the relatively larger open end of the member is fitted tightly into and closes a downwardly-extending port 66 into the chamber 48. The relatively thin wall of the member 64 readily transmits heat to the plate 62, which thereupon is adapted to bend inwardly and cause closing of the valve 57 against the annular end of the sleeve 52. The valve is floatingly mounted by the pins 58 and the abutment 61, being within the peripheral outline of the valve seat, causes the valve to adjust itself automatically to the seat. A knob 68 may be provided on the member 46 for manipulating the arm.

As above described, the flow of gas through the pipes 35 and 36 is automatically controlled by the thermostatic plates 62 and, in order to protect these plates and their enclosing cup 64 and to facilitate the operation thereof, I provide a housing 70 therefor. This housing may, for convenience, be threaded to the member 46 and it projects downwardly therefrom in alignment with the port 66. The cup 64 is located wholly within the housing and is thus protected from injury by external contact. The lower end of the housing is open, whereby to receive steam or vapor thereinto, and exit openings 72 through the side wall of the housing permit the exit of the steam. The arrangement is such as to provide a confined channel for conducting a flow of vapor past and into close contact with the free end portion of the cup 64.

Mounted on the member 28 at 74 is a leaf spring 75 having a rounded end 76 riding on the peripheral flanges of the members 28 and 34. The spring permits free movement of the arm 35—36 from the full line position of Fig. 1 to the first broken line position thereof, and the chambers 44 are of a length maintaining communication through the ports 29—30 and 38—39 during this movement. The faces 32—40, however, provide sufficient friction to maintain the arm in any position of adjustment within this angle of movement. At the rearward limit of this arm movement, a rounded shoulder 78 on the member 34 engages the spring end 76, thus providing a definite signal of this limit to the operator. The arm may be swung further rearwardly to the other broken line position of Fig. 1 by exerting sufficient force thereon to pass the shoulder 78 beneath the spring end 76, whereupon such end drops into a notch 79 having an abrupt rear shoulder 80 and a rounded forward shoulder 81. In this position the ports 38 and 39 have passed beyond the chambers 44 to a position cutting off communication to the ports 29 and 30 and the notch serves to hold the arm in this idle position. The shoulder 80 prevents further rearward movement of the arm and the rounded shoulder 81 permits forward movement thereof when the device is again to be used. While the gas to the burner 12 is fully shut off when the arm is in its rearmost position, it will be understood that the gas may also be manually controlled and fully shut off by the valve 24, if desired.

It is desirable that the burner 12 shall continue to be lighted so long as the hand valve 24 is open and the arm 35—36 is in the operating position, and to assure this function I provide a bypass 82 between the ports 38 and 39 through which gas may flow to the burner without passing through the arm and the thermostatically controlled valve 57. A screw 84 is provided for adjusting this flow of gas. Sufficient gas is allowed to pass through this bypass to keep the burner lighted even though the valve 57 should become entirely closed. It sometimes happens that a sudden draft of air striking the burner will cause this low flame to be extinguished and I preferably provide a second bypass and pilot light for relighting the burner under these circumstances. This second bypass conducts gas from the port 30 through the following channels: Upper chamber 44 (Fig. 7), port 85, channel 86 (Fig. 8), port 87 (Figs. 7 and 9) and conduit 88 to a point adjacent to the burner (Fig. 1). The flow of this gas may be controlled by a screw 89.

For reasons hereinafter described, it may also be desirable in many cases to provide the arm with a horizontal movement in addition to its vertical movement and such additional movement is permitted by the following described structure, illustrated in the drawings. The pipes 18 and 21 are threaded into and support a base member 90 having a flat upper face with which contacts the flat bottom face 91 of the member 28. The ports 29 and 30 are in communication with the face 91, which is also provided with cooperating channels 92. A stud 93 on the member 28 extends downwardly through the member 90 and a spring 94 and nut 95 serve to hold the two faces in contact. The arrangement is such that the member 28 may swivel horizontally on the member 90 in the same manner that the member 34 swivels vertically on the member 28. The channels 92 also provide for a free flow of gas through the ports during this horizontal swiveling movement, although these channels will preferably be so constructed as to shut the gas off when the arm is moved to the position shown in broken lines in Fig. 5.

The faces 32 and 40 may with convenience be made absolutely flat and as thus constructed they serve to prevent the escape of gas from the joint therebetween. It may, however, in some cases be desirable to provide further assurance against escaping gas and, to this end, I may form the faces with a leak-proof gasket. Such a gasket is shown at the flat faced joint between the members 28 and 90. The cooperating flat faces of these members are provided with coinciding circular grooves 98 and 99 and a ring 100 is seated within these grooves. When initially assembling these parts, a heavy graphite grease is packed into the grooves and this grease, in conjunction with the ring, provides a very substantial leak-proof gasket. It will be understood that the cooperating flat faces may be chambered in any manner desired or necessary to perform the required functions and that such chambered portion will cooperate with the two ports in the opposite member to establish and cut off communication therebetween when the members are respectively in different relative positions.

The operation of my improved regulating device may be briefly described as follows. When not in use, the arm is swung to its rearmost position, either vertically or horizontally, in which position the gas communication to the burner 12 is automatically and completely shut off. When the burner is to be used, the arm is swung forwardly a sufficient distance to open the gas ports and the burner is lighted. During this initial operation, the flow of gas may be controlled manually by means of the valve 24.

In Figs. 1 and 10, I have shown the arm in two operative positions relative to a vessel 96 having a cover 97 thereon. In the position of Fig. 1, the housing 70 is in alignment with but somewhat spaced from a hole in the cover, while in Fig. 10 the housing is extended through the hole and into the vessel. In either position steam or vapor from the vessel will pass upwardly into the housing, into contact with the member 64 and out through the exit holes 72, and the heat therefrom will cause the thermostatic plates 62 to bend inwardly and close the valve 57, thereby shutting off the flow of gas to the burner. In the position of Fig. 10, however, the steam, which reaches the member 64 more readily, is somewhat hotter and thus causes greater closing movement of the valve 57, while in the position of Fig. 1 the valve is not closed so tightly and more gas is admitted to the burner. Thus by varying the proximity of the housing to the opening into the vessel, the degree of heat can be nicely regulated, it being clear that if a mere simmering of the liquid in the vessel is desired the housing will be placed in the position of Fig. 10, whereas if greater boiling thereof is required the housing will be adjusted to a position away from the opening. It will also be understood that the arm support is provided with sufficient friction to retain the arm in any of these positions of adjustment.

Many vessels, such as hot water kettles, tea and coffee pots, etc., have a spout opening therefrom into the atmosphere and which spout provides a convenient opening for receiving the housing 70. This spout, however, is ordinarily located considerably to one side of the vessel and either the housing or vessel must be adjusted laterally to accommodate the housing to the spout. Since it is desirable that the vessel shall remain centrally disposed over the burner, it is necessary to provide the housing with this lateral adjustment, and such an adjustment is provided by the swivel arrangement 90—91 above described. This joint 90—91, in cooperation with the joint at 32—40, provides universal movement to the arm, whereby it can be conveniently adjusted to accommodate the position of such spouts, as shown in Fig. 5.

Having thus described my invention, what I claim as new and desire to secure by Letters Patent is:

1. In a device of the class described, a burner, means for conducting fuel to the burner and including an arm, means mounting the arm for pivotal movement in a vertical plane toward and from the burner, means mounting the arm for pivotal movement in a horizontal plane, and means including a thermostatic member carried by the arm for controlling automatically the flow of fuel to the burner, the thermostatic member being adapted to be placed into heat conductive relation with a vessel on the burner and heat transmission therefrom to the member being adapted to cause movement of the thermostatic member and a reduction in the flow of fuel to the burner.

2. In a device of the class described, a gas burner, means for conducting gas to the burner and including an arm having two gas ports therethrough, means mounting the arm for pivotal movement in a vertical plane toward and from the burner, means mounting the arm for pivotal movement in a horizontal plane, and means including a valve and a cooperating thermostatic member carried by the arm for controlling automatically the flow of gas through said ports, the thermostatic member being adapted to be placed into heat conductive relation with a vessel on the burner and heat transmission from the vessel to the member being adapted to cause closing movement of the valve.

3. In a gas controlling mechanism, a supporting member having a flat face and two gas conducting ports therethrough and in communication with said face, an arm having a flat face and two gas conducting ports therethrough and in communication with its face, and means mounting the arm on said member with the two flat faces in contact and relatively movable about an axis normal to said faces, the first-named two ports being in communication with the second-named two ports respectively in varying positions of the arm about said axis.

4. The mechanism defined in claim 3, plus a base member having a flat face and two gas conducting ports therethrough and in communication with said face, said supporting member having a second flat face relatively angular to its first-named face and its said two ports being in communication therewith, and means mounting said second flat face in contact with the base member flat face whereby to permit relative movement of the members about an axis normal to the faces, the first-named two ports being in communication with the two base member ports respectively in various relative positions of the members about said axis.

5. The mechanism defined in claim 3, plus a latch permitting a limited movement of the arm about said axis without cutting off said communication of the ports, and means including shoulders engageable by the latch for holding the arm in a retracted position and interrupting said communication when the arm is moved beyond said limit.

6. In a device of the class described, a gas burner, means for conducting gas to the burner and including an arm having two gas ports therethrough, means mounting the arm for pivotal movement about a horizontal axis toward and from the burner, means including a valve and a cooperating thermostatic member carried by the arm for controlling automatically the flow of gas through said ports, the thermostatic member being adapted to be placed into heat-conductive relation with a vessel on the burner and heat transmission from the vessel to the member being adapted to cause closing movement of the valve, a spring latch permitting a limited movement of the arm about said axis without cutting off the flow of gas through said ports, and means including shoulders engageable by the latch for holding the arm in a retracted position and shutting off said flow of gas when the arm is moved beyond said limit.

7. In a device of the class described, a burner, means for conducting fuel to the burner, a movable member, a chambered housing carried by the member and having an open end permitting the passage of steam into the chamber and another opening permitting the exit of the steam therefrom, means including a thermostatic member within the housing for controlling automatically the flow of fuel to the burner, and means for supporting the member with the housing thereof in different positions of proximity to an opening into the interior of a vessel on the burner, the action of the thermostatic member varying with the proximity of said housing to said opening.

8. In a device of the class described, a gas burner, means for conducting gas to the burner and including an arm having two gas ports therethrough, a chambered housing carried by the arm and having an open end permitting the passage of steam into the chamber and another opening permitting the exit of the steam therefrom, a closed, hollow and relatively thin-walled member extending from said arm into the chamber, a thermostatic element within the member, a valve cooperating with the element, steam passing through the housing being adapted to contact with the member and cause movement of the element and valve to reduce the flow of fuel to the burner, and means mounting the arm for pivotal movement in a vertical plane toward and from an opening into the interior of a vessel on the burner, the action of the thermostatic member varying with the proximity of said housing to the opening and the arm mounting having sufficient friction to retain the arm and housing in varying positions of proximity to said opening.

9. In a device of the class described, a burner, means for conducting fuel to the burner and including a substantially rigid arm, a chambered housing carried by said arm and having an open end permitting the passage of steam into the chamber and another opening permitting the exit of the steam therefrom, a closed, hollow and relatively thin-walled member extending from said arm into the chamber, a thermostatic element within the member, a valve cooperating with the element, and means mounting said arm for pivotal movement toward and from the burner whereby said open end of the housing can be brought adjacent to and into alignment with an opening into a vessel over the burner, steam passing from the vessel and through the housing being adapted to contact with said member and cause movement of the element and valve to reduce the flow of fuel to the burner.

10. The device set forth in claim 9, wherein said arm comprises a pair of substantially rigid pipes pivotally mounted at one end and carrying said housing and the parts cooperating therewith on the other end.

11. The device set forth in claim 9, wherein said member is located wholly within the housing and is thus protected against injury from external contact.

12. In a gas controlling mechanism, a supporting member having a flat face and two gas conducting ports therethrough and in communication with said face, a second member having a flat face and chambered inwardly of said face to cooperate with said ports when the two faces are in contact, and means mounting the members together with the two flat faces in contact and relatively movable about an axis normal to said faces, communication between said ports permitting the passage of gas therethrough being established in one relative position of said members about said axis and being cut off in another relative position thereof.

ANTON M. VEDOE.